(12) United States Patent
Berger

(10) Patent No.: US 11,163,772 B2
(45) Date of Patent: Nov. 2, 2021

(54) METHOD AND APPARATUS FOR RESOLVING DISPARATE VALUES FOR DATA ELEMENTS WITHIN A PLURALITY OF RELATED RECORDS

(71) Applicant: Change Healthcare Holdings, LLC, Nashville, TN (US)

(72) Inventor: Elisabeth Berger, Orinda, CA (US)

(73) Assignee: CHANGE HEALTHCARE HOLDINGS, LLC, Nashville, TN (US)

( * ) Notice: Subject to any disclaimer, the term of this patent is extended or adjusted under 35 U.S.C. 154(b) by 238 days.

(21) Appl. No.: 15/071,611

(22) Filed: Mar. 16, 2016

(65) Prior Publication Data

US 2017/0270164 A1 Sep. 21, 2017

(51) Int. Cl.
 *G06F 16/20* (2019.01)
 *G06F 16/2455* (2019.01)
 *G06F 16/215* (2019.01)
 *G06F 16/23* (2019.01)
 *G06F 40/205* (2020.01)

(52) U.S. Cl.
 CPC ...... *G06F 16/24553* (2019.01); *G06F 16/215* (2019.01); *G06F 16/2365* (2019.01); *G06F 40/205* (2020.01)

(58) Field of Classification Search
 CPC .................................................. G06F 17/30483
 USPC ......................................................... 707/755
 See application file for complete search history.

(56) References Cited

U.S. PATENT DOCUMENTS

| | | | | |
|---|---|---|---|---|
| 9,223,836 | B1* | 12/2015 | Fletcher | G06F 16/3344 |
| 2002/0055865 | A1* | 5/2002 | Hammann | G06Q 10/0631 |
| | | | | 705/7.37 |
| 2003/0046280 | A1* | 3/2003 | Rotter | G06Q 50/24 |
| 2004/0117215 | A1* | 6/2004 | Marchosky | G16H 10/60 |
| | | | | 705/3 |
| 2012/0303376 | A1* | 11/2012 | Shishido | G06Q 30/02 |
| | | | | 705/1.1 |
| 2014/0180826 | A1* | 6/2014 | Boal | G06Q 30/0245 |
| | | | | 705/14.66 |

* cited by examiner

*Primary Examiner* — Jau Shya Meng
(74) *Attorney, Agent, or Firm* — Myers Bigel, P.A.

(57) ABSTRACT

A method, computing device and computer program product are provided to obtain information from a plurality of dissimilar records by estimating the most accurate value for each field of the plurality of records. A computing device may include processing circuitry configured to: receive a first record including two or more elements, where a first element of the first record has a first value; receive a second record comprising two or more elements, where a first element of the second record has a second value; receive a third record having two or more elements, where a first element of the third record has a third value; and determine a resultant value for the first element, where the resultant value for the first element is determined based on a frequency of occurrence of a value for the first element among the first value, the second value, and the third value.

19 Claims, 9 Drawing Sheets

METHOD AND APPARATUS FOR RESOLVING DISPARATE VALUES FOR DATA ELEMENTS WITHIN A PLURALITY OF RELATED RECORDS

TECHNOLOGICAL FIELD

An example embodiment of the present invention relates generally to obtaining information from a plurality of records, and more particularly, to creating a new record using data from a plurality of different sources through the reconciliation of data elements within disparate records.

BACKGROUND

Record keeping in various industries has evolved from paper records to digital records, which may be maintained locally on individual personal computers, local servers for an office, or broader, regional or national servers which may be accessible from anywhere. The ability to store digital records in multiple locations, and to generate records in multiple locations, results in record disagreement and an increased likelihood of erroneous information.

BRIEF SUMMARY

A method, computing device and computer program product are provided according to an example embodiment in order to obtain information from a plurality of dissimilar records by estimating the most accurate value for data elements of the plurality of records. In this regard, the method, computing device and computer program product may enable a new record to be generated in response to an information request, where the record comprises one or more data elements of the plurality of records and includes the most accurate value for those data elements.

A computing device according to an example embodiment may include processing circuitry configured to: receive a first record including two or more elements, where a first element of the first record has a first value; receive a second record comprising two or more elements, where a first element of the second record has a second value; receive a third record having two or more elements, where a first element of the third record has a third value; and determine a resultant value for the first element, where the resultant value for the first element is determined based on a frequency of occurrence of a value for the first element among the first value, the second value, and the third value, where the highest frequency occurrence of a value is determined to be the resultant value for the first element. A second element of the first record may have a first value, a second element of the second record may have a second value, and a second element of the third record may have a third value. The processing circuitry may optionally be configured to determine a resultant value for the second element, where the resultant value for the second element is determined based on the frequency of occurrence of a value for the second element among the first value, second value, and third value of the second element, where the highest frequency occurrence of a value is determined to be the resultant value for the second element.

According to some embodiments, the resultant value for the first element may correspond with a value of the first element from one of the first record, the second record, or the third record, where the resultant value for the second element corresponds with a value of the second element from one of the first record, the second record, or the third record, where the one of the first record, second record, or third record corresponding with the resultant value for the first element is different from the one of the first record, second record, or third record corresponding with the resultant value for the second element. The processing circuitry may further be configured to generate a new (or resultant) record including the resultant value for the first element and the resultant value of the second element. The processing circuitry may optionally be configured to provide an indication for the first element that at least one of the first value of the first element, the second value of the first element, or the third value of the first element is different from the resultant value of the first element.

According to some embodiments, the processing circuitry may be configured to provide access to the first record, the second record, or the third record in response to a user selection of the resultant value of the first element, and present the at least one of the first value of the first element, the second value of the first element, or the third value of the first element that is different from the resultant value of the first element. The new record may include a medication list associated with a patient, where the first element is a first medication and the second element is a second medication, and the first, second and third records, respectively, are associated with the patient. The second record may be a revised version of the first record. The first record may be associated with a first source, the second record may be associated with a second source, and the third record may be associated with a third source. Each of the first source, second source, and third source may include a respective reliability value, where the value of the first element from each respective record may include a reliability weight based on the reliability value of the respective source. In response to a user selection of one of the first value of the first record, the second value of the first record, or the third value of the first record, the reliability weight of the selected value may be increased.

Embodiments described herein may provide a method including: receiving a first record having two or more elements, where a first element of the first record has a first value; receiving a second record having two or more elements, where a first element of the second record has a second value; receiving a third record having two or more elements, where a first element of the third record has a third value; and determining a resultant value for the first element, where the resultant value for the first element is determined based on a frequency of occurrence of a value for the first element from among the first value, the second value, and the third value of the first element, where the highest frequency occurrence of a value is determined to be the resultant value for the first element. According to some embodiments, a second element of the first record has a first value, a second element of the second record has a second value, and a second element of the third record has a third value. The method may include determining a resultant value for the second element, where the resultant value for the second element is determined based on a frequency of occurrence of a value for the second element from among the first value, the second value, and the third value of the second element, where the highest frequency occurrence of a value is determined to be the resultant value for the second element.

According to some embodiments, the resultant value of the first element corresponds with a value of the first element from one of the first record, the second record, or the third record, where the resultant value of the second element corresponds with a value of the second element from one of the first record, the second record, or the third record, and where the one of the first record, second record, or third record corresponding with the resultant value for the first element is different from the one of the first record, second record, or third record corresponding with the resultant value for the second element. Methods may include generating a new (or resultant) record including the resultant value of the first element and the resultant value of the second element. Methods may include providing an indication for the first element that at least one of the first value of the first element, the second value of the first element, or the third value of the first element is different from the resultant value of the first element. According to some embodiments, the method may provide access to the first record, the second record, or the third record in response to a user selection of the resultant value of the first element, and presenting the at least one of the first value of the first element, the second value of the first element, or the third value of the first element that is different from the resultant value of the first element.

According to some embodiments, the new record may include a medication list associated with a patient where the first element is a first medication and the second element is a second medication, and the first, second and third records, respectively, are associated with the patient. The first record may be associated with a first source, the second record may be associated with a second source, and the third record may be associated with a third source. Each of the first source, the second source, and the third source may have a respective reliability value, where the value of the first element from each respective record includes a reliability weight based on the reliability value of the respective source. In response to a user selection of one of the first value of the first element, the second value of the first element, or the third value of the first element, the reliability weight of the selected value may be increased.

Embodiments of the present invention may include a computer program product having a non-transitory computer readable storage medium having program code portions stored therein. The program code portions may be configured, upon execution, to: receive a first record having two or more elements, where a first element of the first record has a first value; receive a second record having two or more elements, where a first element of the second record has a second value; receive a third record having two or more elements, where a first element of the third record has a third value; and determine a resultant value for the first element, where the resultant value for the first element is determined based on a frequency of occurrence of a value for the first element from among the first value, the second value, and the third value of the first element, where the highest frequency occurrence of a value is determined to be the resultant value for the first element.

BRIEF DESCRIPTION OF THE DRAWINGS

Figure 1:
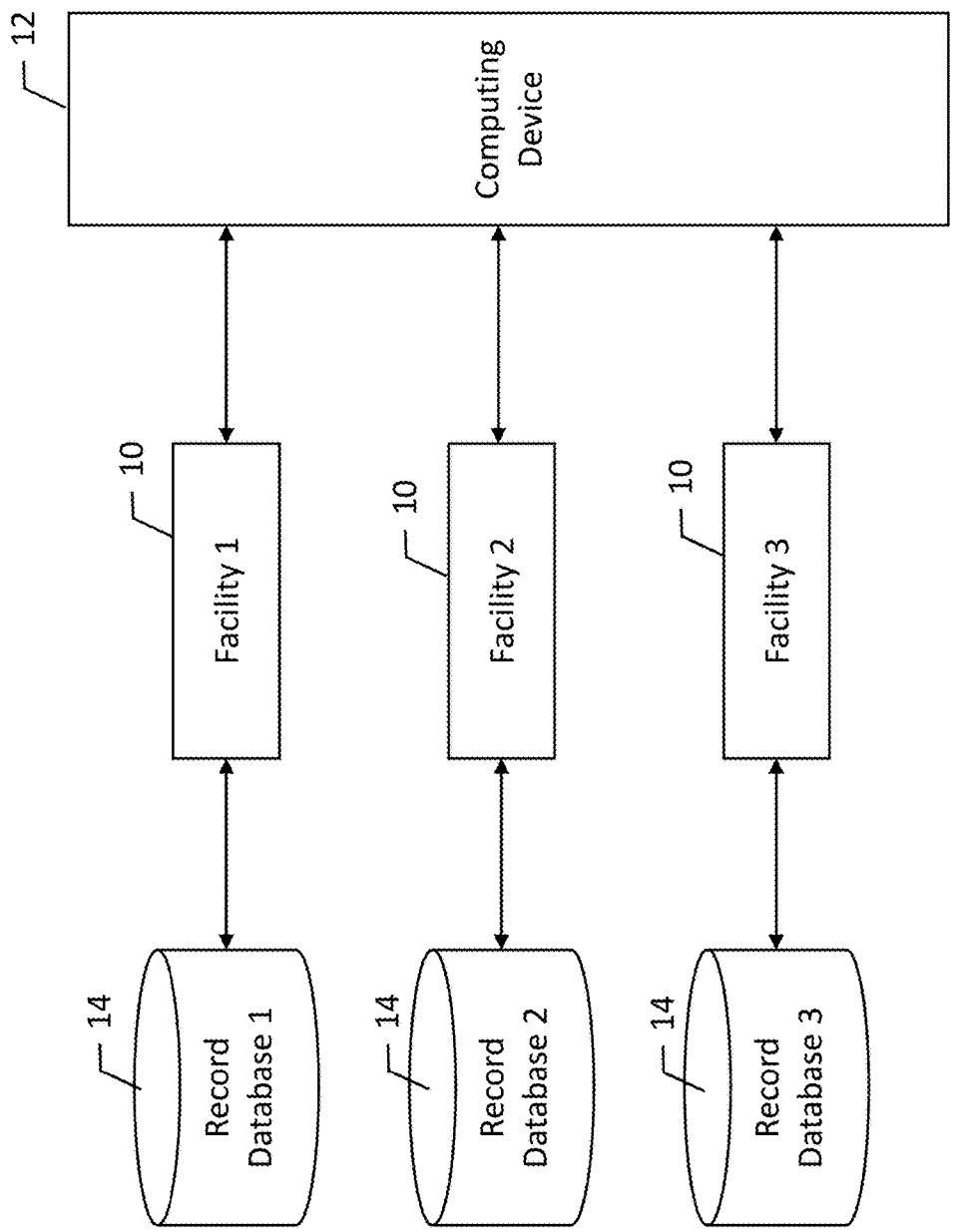
Figure 2:
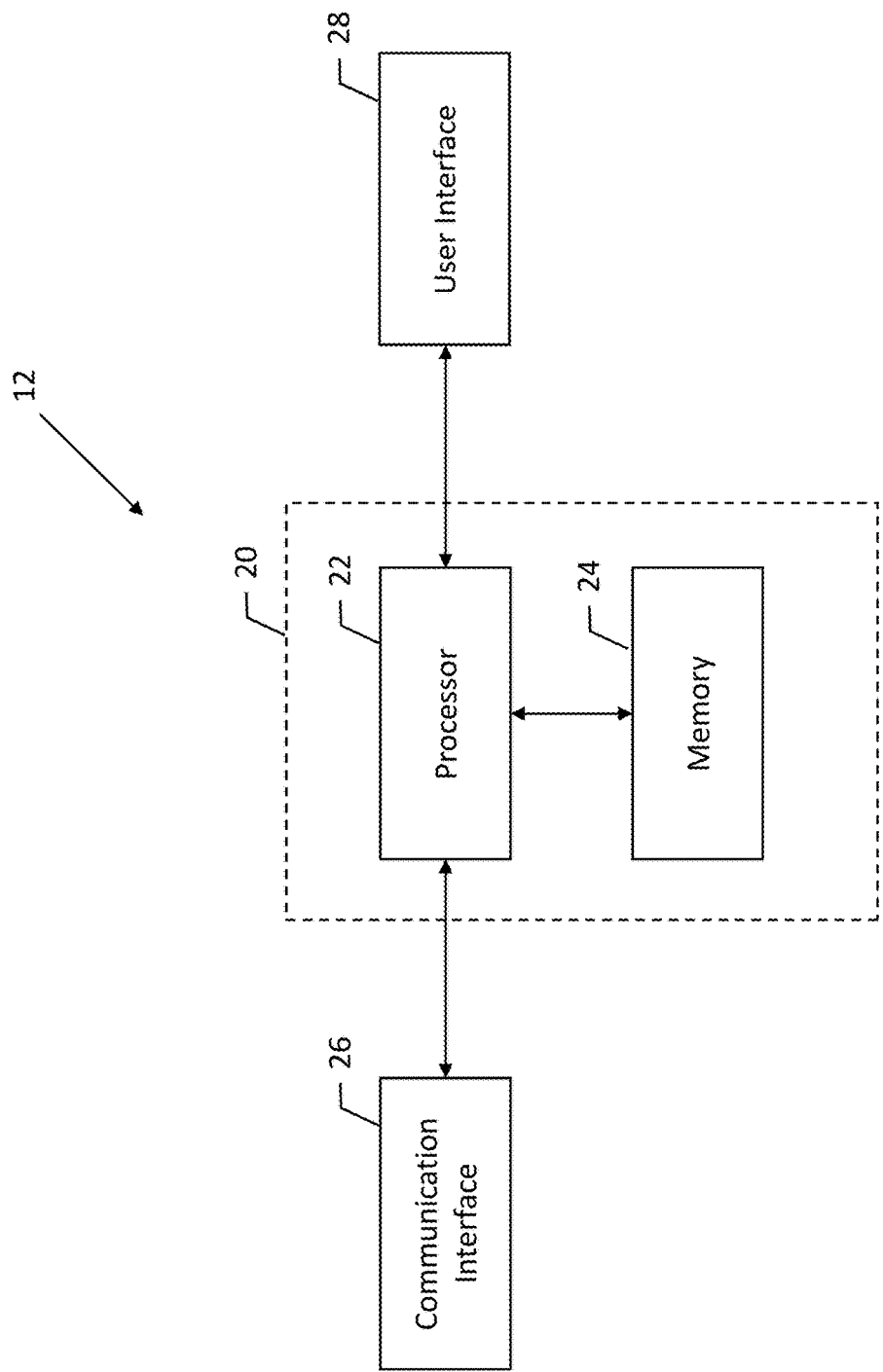
Figure 3:
Figure 4:
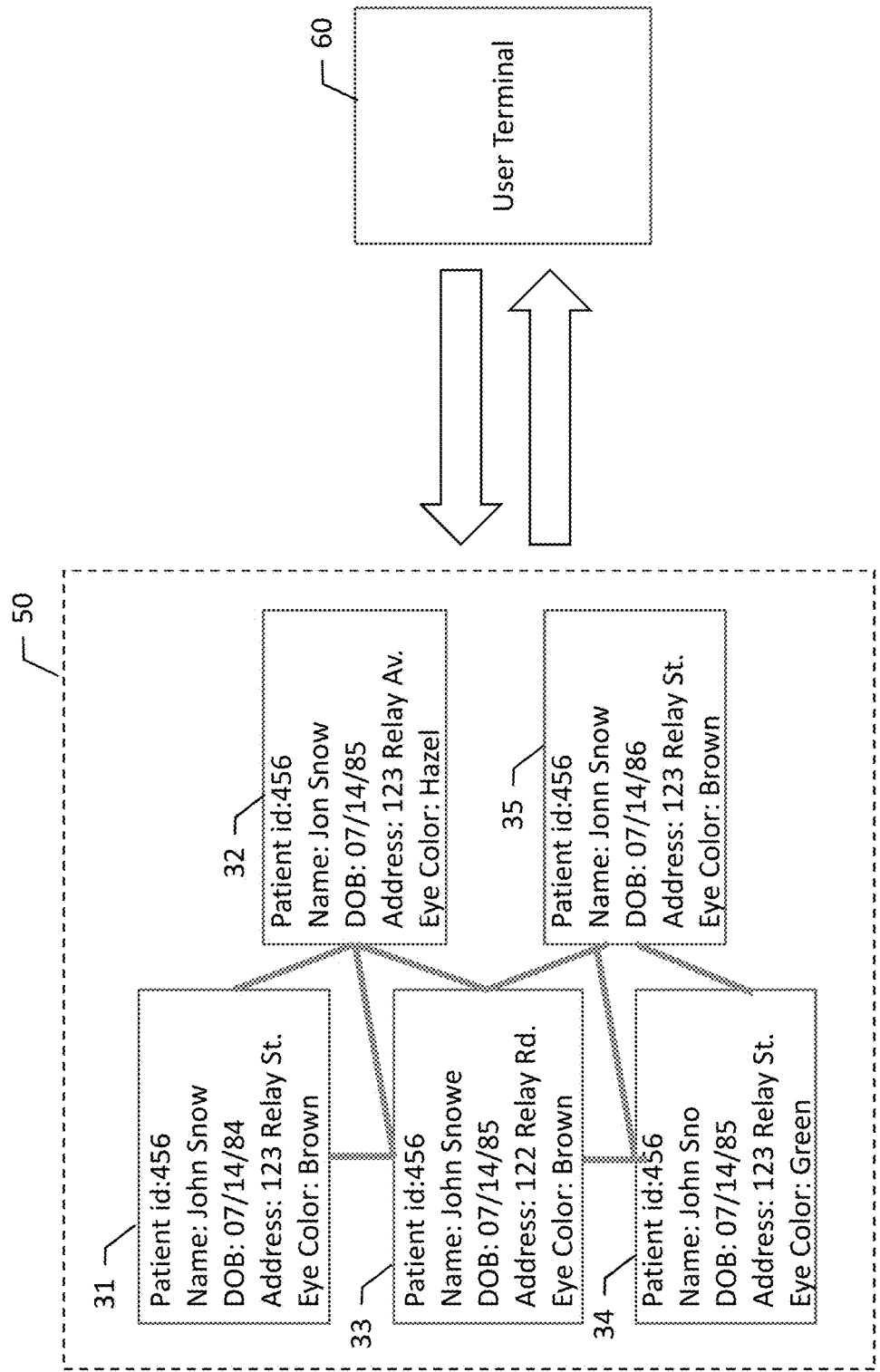
Figure 5:
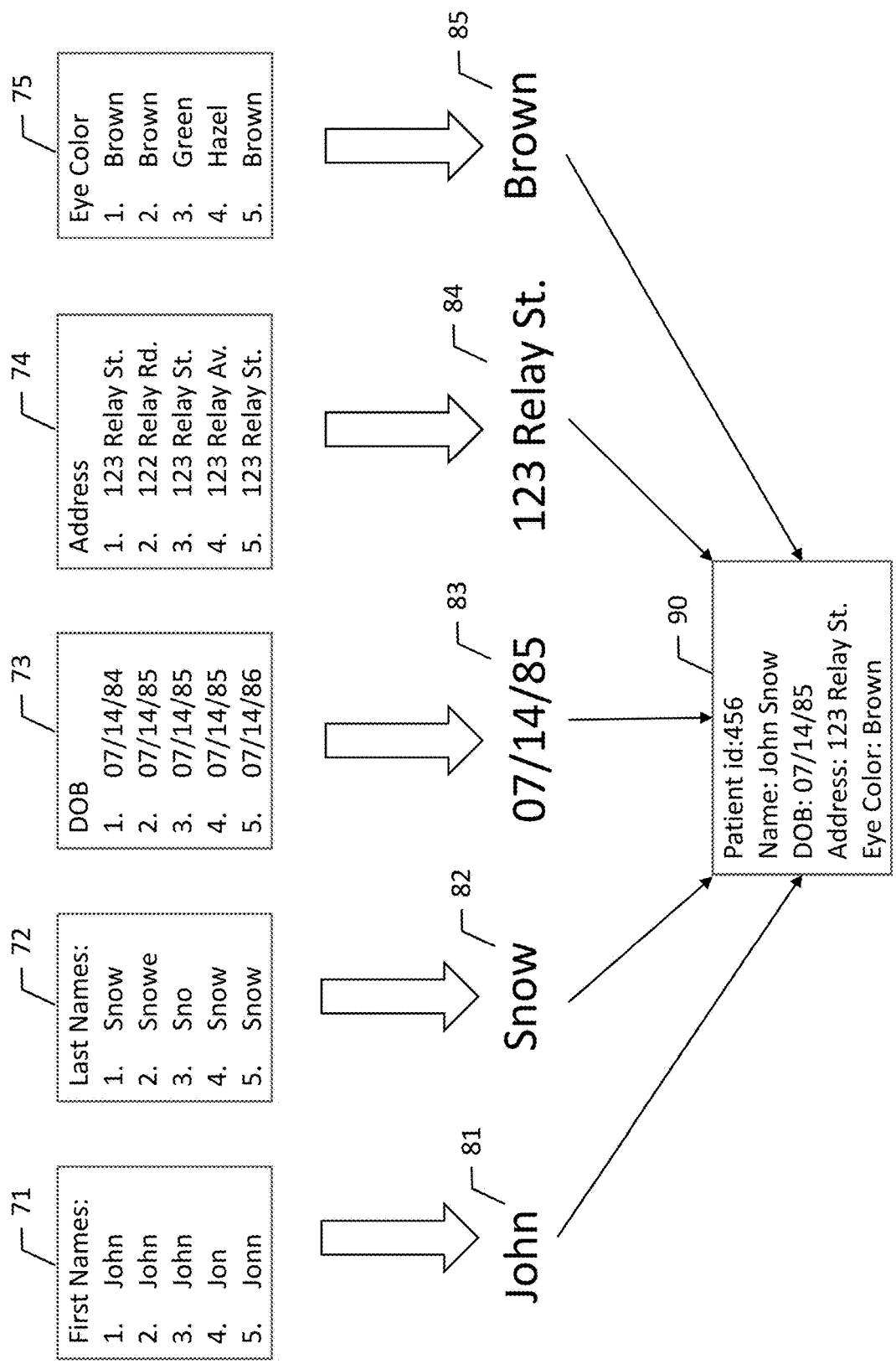
Figure 6:
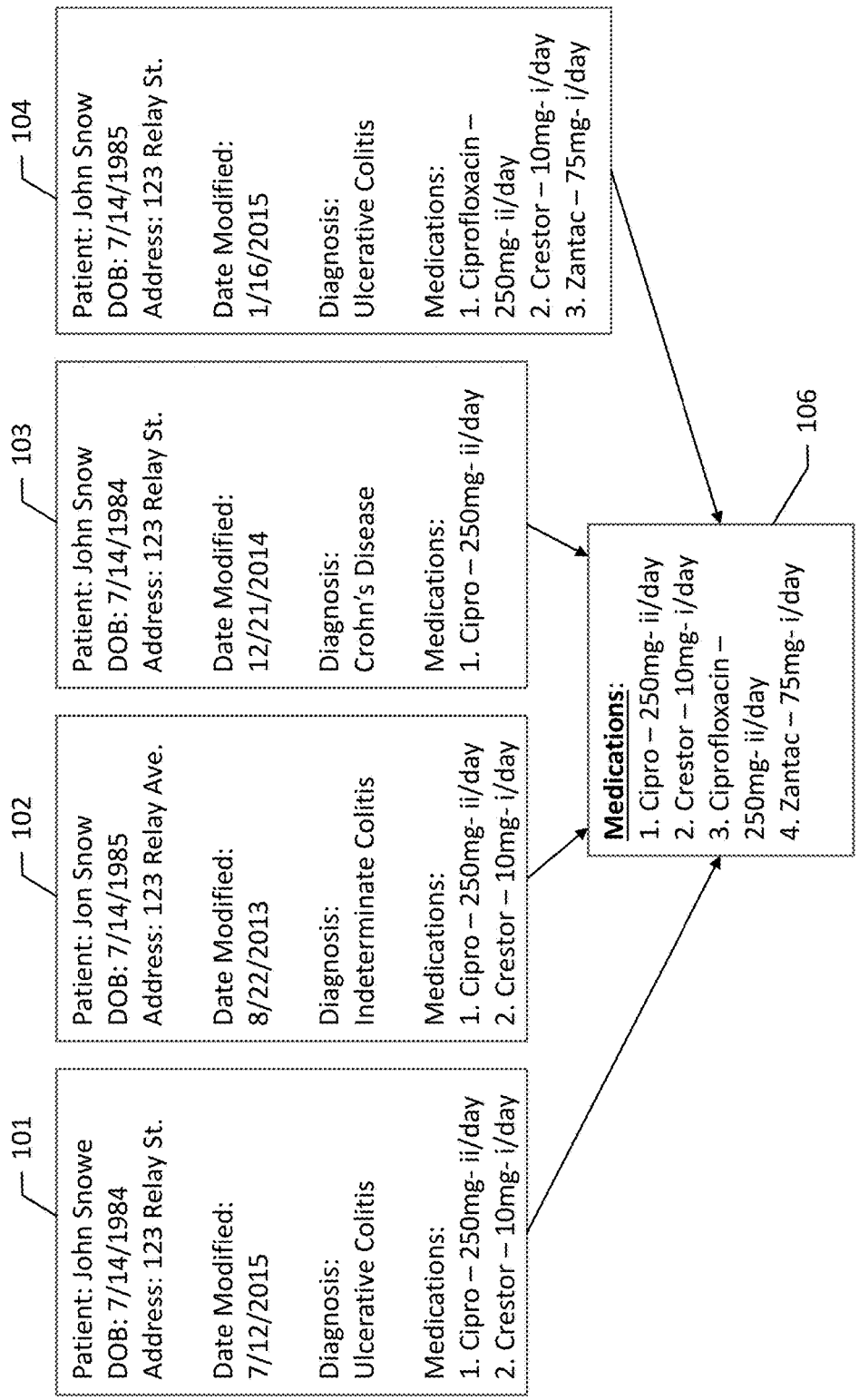
Figure 7:
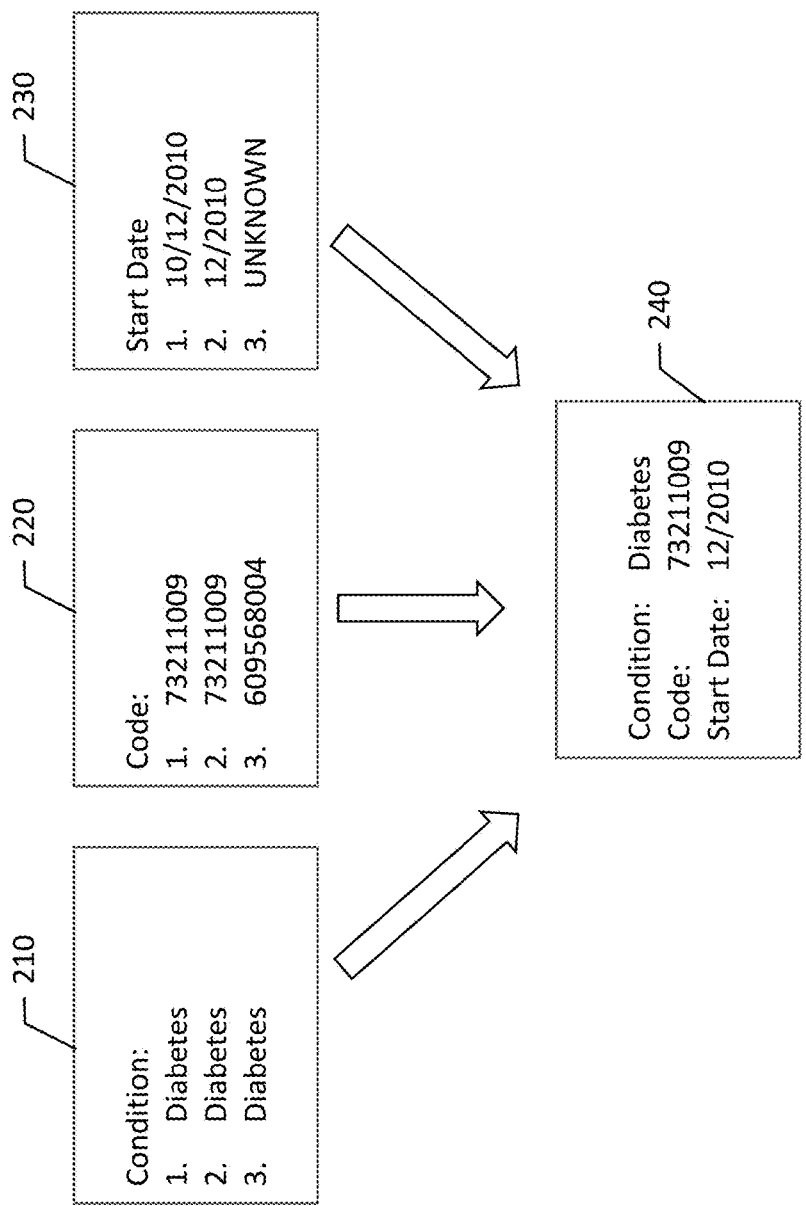
Figure 8:
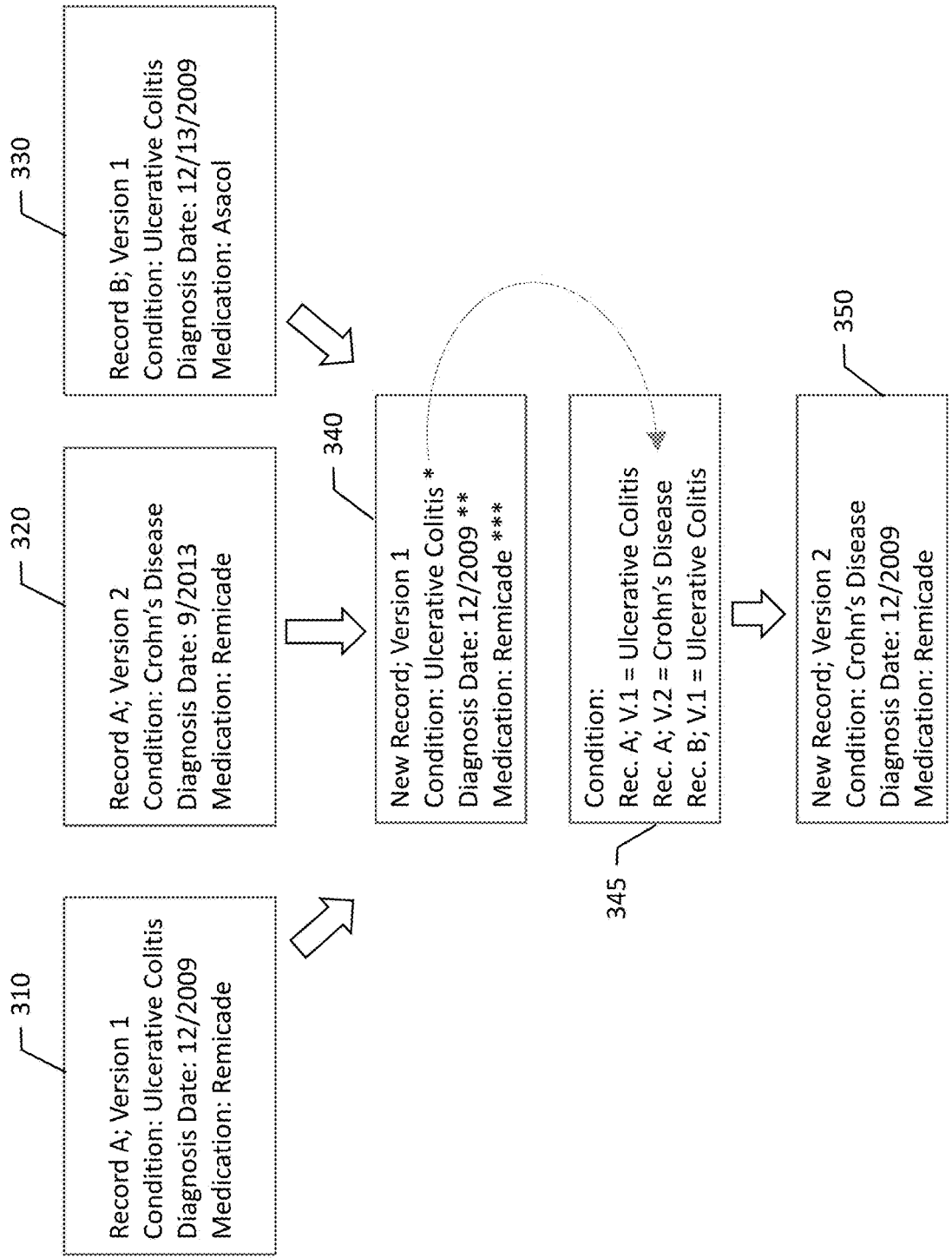
Figure 9:
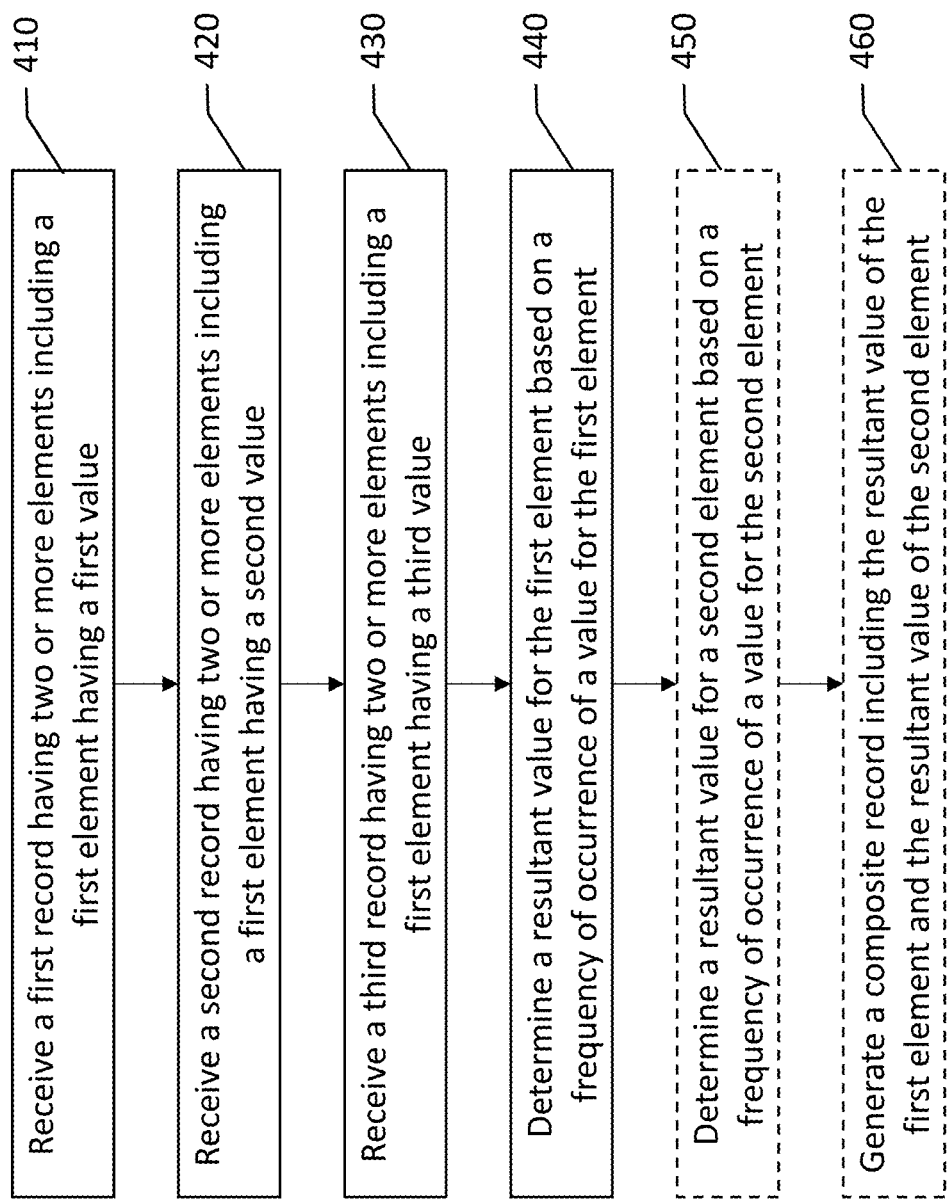

Having thus described certain example embodiments of the invention in general terms, reference will now be made to the accompanying drawings, which are not necessarily drawn to scale, and wherein:

FIG. 1 is a schematic representation of a system for processing records that may be specifically configured in accordance with an example embodiment of the present invention;

FIG. 2 is a block diagram of a computing device that may be specifically configured in accordance with an example embodiment of the present invention;

FIG. 3 is an illustration of record matching logic for linking a plurality of records according to an example embodiment of the present invention;

FIG. 4 is an illustration of a plurality of linked records as associated through the matching logic of FIG. 4 according to an example embodiment of the present invention;

FIG. 5 is an illustration of majority rules logic employed to establish a new record from information within the plurality of associated records according to an example embodiment of the present invention;

FIG. 6 illustrates another example embodiment of logic employed to generate a new record from information within a plurality of associated records according to an example embodiment of the present invention;

FIG. 7 depicts still another example embodiment of logic employed to generate a new record from information within a plurality of associated records according to an example embodiment of the present invention;

FIG. 8 illustrates an example embodiment of logic employed to generate a new record from information within a plurality of associated records including user input according to an example embodiment of the present invention; and FIG. 9 is a flowchart of a method employed for generating a new record from information within a plurality of associated records according to an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Further, the apparatus and method of example embodiments of the present invention will be primarily described in conjunction with medical records and medication lists. It should be understood, however, that the apparatus and method may be used in conjunction with a variety of other applications, both in the medical industry and outside the medical industry. Like numbers refer to like elements throughout.

A method, computing device and computer program product are provided in accordance with an example embodiment in order to process records and resolve disparate values for data elements within the records. This may be done in order to create a new record satisfying an information request using information within the plurality of records. In this regard, the method, computing device, and computer program product of the example embodiment may be configured to process a wide variety of different types of records, such as tax records, employment records, criminal records, student records, medical records, medication lists, passenger lists, or any other type of structured data having a plurality of data elements contained therein.

By way of example, but not of limitation, the method, apparatus and computer program product will be hereinafter described in conjunction with the processing of patient records in order to identify one or more patient records that are associated with a particular person of interest, or to identify records that are associated with a population of interest, and to generate a new record that satisfies an information request and is informed by information within the plurality of records. Each patient record may include a plurality of demographic attributes associated with the patient, such as the first, middle and last name of the person, the mailing address of the person, the date of birth of the person, etc. Additionally, a patient record may include information describing one or more encounters of a patient with a respective healthcare facility. Patient records may include information regarding a wide variety of encounters including office visits, laboratory tests, hospital admittances, imaging appointments, etc. Some patient records may also include or otherwise be associated with one or more documents. The documents may be associated with one or more of the encounters for which the patient record includes information. The documents may include, for example, laboratory results, notes taken by a physician during an office visit, imaging studies or the like.

According to an example embodiment, patient records may be created by a healthcare facility that treats a patient. In instances in which the patient has visited a plurality of different healthcare facilities, the patient may have patient records that have been created by each of the plurality of different healthcare providers. Each healthcare facility may store the patient records for the patients that have been treated by the respective healthcare facility in order to memorialize the health care provided to the patient by the respective healthcare facility. As such, the patient records created by a plurality of healthcare facilities for respective patients may not be generally stored in a common database, but are, instead, stored in a distributed fashion amongst the plurality of healthcare providers. Further, a healthcare facility may update a patient record with a new version of the patient record. In such an instance, the prior patient record, while typically lost, may be stored for inclusion in the processing of records to determine the most accurate record for a patient as described below.

Each healthcare facility may assign a patient identifier for each patient treated by the respective healthcare facility that is unique within the healthcare facility or within that particular healthcare network. However, different healthcare networks or different providers, such as pharmacies, specialists, labs, etc., may not include this same unique identifier, and may have a unique identifier of their own. Further, among a healthcare network sharing a unique identifier for a patient, the information associated with that unique identifier may be different among different databases storing record information. With all of the available records and information associated with each patient, it may be difficult to get clear, concise and accurate answers to specific questions about a patient in an efficient and trustworthy manner. For example, a user may want to know what medications a patient is taking, or what specific condition he or she suffers and when it started, where the answer is informed by information contained across multiple, disparate and separately stored and owned records. In view of these challenges, it may be desirable to identify relevant data elements within each of the disparate records and then resolve for disparity in the values for those data elements. The results may then be provided in the form of a new record including accurate values for the identified data elements (e.g., a medication list or a condition/diagnosis statement).

While a plurality of records that are associated with one another and including conflicting data elements could be stored in a single database, embodiments may also include a plurality of databases, each associated with a different facility, such as that which is depicted in FIG. 1. FIG. 1 illustrates a block diagram of an example network infrastructure in accordance with embodiments of the present invention. The example network infrastructure may include a plurality of facilities 10, which may be healthcare facilities (e.g., doctor's offices, hospitals, etc.), pharmacy facilities (e.g., retail pharmacies), financial services facilities (e.g., banks, tax preparation offices, etc.), retail facilities (e.g., stores, auto service centers, etc.), or any facility that may keep record of a patient, customer, or client. Each facility 10 may be in communication with a computing device 12, such as via respective application programming interfaces (APIs) or via portal applications (e.g., a web browser interface), or the like. Although three facilities are depicted in FIG. 1, the system may include any number of facilities, with as few as one facility including multiple related records, or a plurality of facilities each including one or more related records. Each facility may include or be in communication with a database 14 for storing records. These records may be dependent upon the type of facility 10 they are associated with. For example, a retail store may have a customer database with customer records including demographic information, personal information, purchase history, etc. A healthcare facility may include records for patient information, patient insurance information, physician information, etc. As described below, the computing device 12 may be configured to access records from the facilities 10 to establish records that are related to one another, and to create a new record that includes that which is established as the most accurate information available for elements of that record.

FIG. 2 illustrates a block diagram of a computing device 12 in accordance with some example embodiments. The computing device is capable of functioning in a variety of information infrastructures for handling data records and may be embodied by one or more servers, computer workstations, tablet computers, desktop or laptop computers or the like. As described below, the computing device may be configured to implement and/or otherwise support implementation of various example embodiments. However, it should be noted that the components, devices, or elements illustrated and described with respect to FIG. 2 below may not be mandatory, and thus some may be omitted in certain embodiments. Additionally, some embodiments may include further or different components, devices, or elements beyond those illustrated in and described with respect to FIG. 2.

The computing device 12 may include or otherwise be in communication with processing circuitry 20 that is configurable to perform actions in accordance with one or more example embodiments disclosed herein. In this regard, the processing circuitry may be configured to perform and/or control performance of one or more functionalities of the computing device in accordance with various example embodiments, and thus may provide means for performing functionalities of the computing device. The processing circuitry may be configured to perform data processing, application execution and/or other processing and management services according to one or more example embodiments.

In some example embodiments, the processing circuitry 20 may include a processor 22 and, in some embodiments, such as that illustrated in FIG. 2, may further include memory 24. The processing circuitry may be in communication with or otherwise control a communication interface 26 and, in some embodiments, a user interface 28. As such, the processing circuitry 20 may be embodied as a circuit chip (e.g., an integrated circuit chip) configured (e.g., with hardware, software or a combination of hardware and software) to perform operations described herein.

The processing circuitry 20 may be embodied in a number of different ways. For example, the processing circuitry 20 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processing circuitry 20 may be configured to execute instructions stored in the memory 24 or otherwise accessible to the processing circuitry 20. As such, whether configured by hardware or software methods, or by a combination thereof, the processing circuitry 20 may represent an entity (e.g., physically embodied in circuitry) capable of performing operations according to embodiments of the present invention while configured accordingly. Thus, for example, when the processing circuitry 20 is embodied as an ASIC, FPGA or the like, the processing circuitry 20 may be specifically configured hardware for conducting the operations described herein. Alternatively, as another example, when the processing circuitry 20 is embodied as an executor of software instructions, the instructions may specifically configure the processing circuitry 20 to perform the operations described herein.

In an example embodiment, the memory 24 may include one or more non-transitory memory devices such as, for example, volatile and/or non-volatile memory that may be either fixed or removable. The memory 24 may be configured to store information, data, applications, instructions or the like for enabling the apparatus to carry out various functions in accordance with example embodiments of the present invention. For example, the memory 24 could be configured to buffer input data for processing by the processing circuitry 20. Additionally or alternatively, the memory 24 could be configured to store instructions for execution by the processing circuitry 20. As yet another alternative, the memory 24 may include one of a plurality of databases that may store a variety of files, records, contents or data sets. Among the contents of the memory 24, applications may be stored for execution by the processing circuitry in order to carry out the functionality associated with each respective application.

The user interface 28 may be in communication with the processing circuitry 20 to receive an indication of a user input at the user interface and/or to provide an audible, visual, mechanical or other output to the user. As such, the user interface may include, for example, a keyboard, a mouse, a joystick, a display, a touch screen display, a microphone, a speaker, a Light Emitting Diode (LED), a lighting device, an electronic sensor for capturing human body movements, and/or other input/output mechanisms. In embodiments in which the computing device 12 is implemented on a server, aspects of the user interface may be limited, or the user interface may even be eliminated. For example, the computing device may act as a server or host device, with a user interface provided by a client application.

The computing device 12 may include one or more communication interfaces 26 for enabling communication with other devices and/or networks. In some cases, the communication interface 26 may be any means such as a device or circuitry embodied in either hardware, or a combination of hardware and software that is configured to receive and/or transmit data from/to a network and/or any other device or module in communication with the processing circuitry. In this regard, the communications interface 26 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

Having now described computing device 12 configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Embodiments of the present invention may include methods, computing devices, and computer program products for obtaining information from a plurality of records, and more particularly, to resolving disparity in values for certain data elements of the plurality of records and generating a new record comprising those values.

Record information may be improperly entered in some circumstances and record information may often be subject to change. A record of personal information, which may be used in healthcare, retail, or governmental databases 14, among others, may include demographic and contact information regarding a certain individual. This information, even if entered into a database properly, may become dated and inaccurate, since people may change residences, nicknames may be used, surnames may be changed through marriage or divorce, such that records, particularly when stored across multiple databases, may not be maintained accurately. The methods of example embodiments estimate the most accurate value for one or more data element of a plurality of records containing the one or more data elements. The estimated value or values for the one or more data elements can be used to create a new record that contains one or more data elements of the plurality of records along with the most accurate values for those data elements.

As described herein, establishing the most accurate value for various data elements of a record may be performed using a measure of the most frequently occurring values. Embodiments may further determine a value of a data element from among a plurality of records according to a weight or reliability of information elements from each of the plurality of records. A new record satisfying an information request generated according to example embodiments may include data elements from a plurality of different individual records with what is estimated to be the most accurate value or values for those data elements.

FIG. 3 illustrates an example embodiment of related record determination that may be used to associate records with one another before the records are used to estimate a most accurate value for the various data elements of the records. As shown, records 31-35 are each processed through record matching logic, together with a plurality of other records not shown. This record matching logic may perform record matching through a variety of different record-matching algorithms. Record matching may be performed on degrees of similarity, certain record attributes, or the like. This record matching logic may be performed, for example, on the facility level, such as facilities 10, or at a computing device 12, using processing circuitry 20. Once the record matching logic 40 has determined which records are associated with one another, record link information may be generated at 42. In the illustrated embodiment of FIG. 3, which depicts patient information records, a patient identification number may be used as the primary match determination. Each of the matched records 31-35 include a matching patient identification number.

While the illustrated embodiment of FIG. 3 describes patient records, it is understood that embodiments of the present invention may be applied to any type of data records in retail, financial, etc. Further, embodiments may be used across digital platforms too, such as in social media applications for determining which account records are related, and determining a most accurate value for data elements of an account. As such, the embodiments of FIGS. 3 through 8 are provided merely as example embodiments.

Once the data records are associated with one another through the record matching logic using processing circuitry 20, the database or memory 24 then contains a plurality of disparate records that are determined to relate to the same subject, which is in the instant case a patient. FIG. 4 illustrates an example embodiment of what is stored in database 50, which may be, for example, one of databases 14, or a separate database accessible to the computing device 12 (e.g., in memory 24) of FIG. 1. In the illustrated embodiment of FIG. 4, a user terminal 60 may be used to access database 50, such as via user interface 28. According to an example embodiment, the user terminal 60 may submit a query associated with the patient that is the subject of records 31-35, wherein the response is in the form of a new record that contains one or more data elements from records 31-35.

FIG. 5 illustrates an example embodiment of the present invention in which the most frequently occurring values for one or more data elements of the records is established as the most likely values to be accurate for those data elements. For example, as illustrated in block 71, the value for the data element of "First Name" is extracted from each record, and the values are compared, such as using processing circuitry 20. As shown, there are four instances of "John" and one instance of "Jon", such that "John" is the more frequently occurring value for the data element of "First Name", and the determination is made by processing circuitry 20 that "John" is most likely to be correct. Thus, the value for the data element "First Name" is selected to be "John" for inclusion in the record generated.

FIG. 5 further illustrates that for the data element of "Last Name", "Snow" is the most commonly occurring value, and "Snow" is selected for inclusion in the generated record. Similarly, "07/14/85" is the most commonly occurring date of birth, "123 Relay St." is the most commonly occurring street address, and "Brown" is the most commonly occurring eye color. Thus, each of these values is selected for their respective data elements of the generated record. Record 90 of FIG. 5 is the new record generated from information in the plurality of records 31-35 using the most frequently occurring value for each element 71-75 to arrive at the values for the record 90.

While the selected values for each of the data elements is determined by processing circuitry 20 as the most frequently occurring value, according to some embodiments a data element may not have a most frequently occurring value, such as when each value occurs only once in a plurality of records. In such an embodiment, the value selected for the generated record may be based on a date and/or time associated with the value. For example, the most recent value may be selected.

FIG. 6 illustrates another example embodiment of a plurality of patient records 101-104 that include a plurality of data elements. According to the illustrated embodiment, the patient records each include values for the data elements associated with "medications" indicating the medications taken by the patient associated with the record. The medication data elements include medication name, medication dose, and the number of times per day the medication is to be administered. An inquiry by, for example, a medical practitioner that is seeing the patient may wish to know the medications that patient John Snow has been prescribed or is taking. The medical practitioner may not wish to see the plurality of different records 101-104, but instead see an aggregated record that is generated to present the most likely current medication list for the patient via user interface 26. An inquiry or query may use keywords or data tags such as metadata tags to identify relevant data elements from among a plurality of records regardless of type of records. For example, in the instant embodiment where a list of medications is sought, the medication field from medication records may be determined to be relevant to the search results, while pharmacy records may also be established as relevant.

As shown in FIG. 6, three of the records 101, 102, and 103, include Cipro at a dose of 250 mg, once per day. Record 203, while having the same medication with its full name (Ciprofloxacin) may or may not be recognized as the same medication according to embodiments described herein. The processing circuitry may include a database of medications (e.g., stored on memory 24) indicating medication equivalents, alternative names, generic names, and brand names, for example, and may be able to equate Cipro with Ciprofloxacin. However, some embodiment may not implement such logic, or misspellings may cause medication duplication to appear in a medication list. It may be more desirable to have the medical practitioner review the list of medications to manually perform any de-duplication of medications in order to preclude a medication from inadvertently being de-duplicated through automation.

As shown in the present example, a new record in the form of a medication list 106 generated to satisfy the information request for a medication list for patient John Snow may include Cipro, but may also include Ciprofloxacin. Medication list 106 may also include Crestor at 10 mg, administered once per day. Finally, medication list 106 includes Zantac at 75 mg, once per day. The medication list 106 may arrange the medications in order of certainty or weight, where the medication that is estimated to be most correct may be placed at the top of the medication list. As Cipro appeared in three of the records for John Snow, it may be the most ubiquitous medication and may appear at the top of the list. Crestor similarly appears in three of the four records, such that it is given a higher relative certainty. Both Ciprofloxacin and Zantac, while each appearing only once in the patient records of John Snow, may also be included in the medication list, but given lower priority as they are infrequently occurring.

According to the embodiment of FIG. 6, the most commonly occurring medications are presented in a medication list responsive to an information request for medications for patient John Snow. However, the infrequently occurring medications are also presented. While not shown, the generated record may further include some indication of the relative priority for values included. Alternatively, some generated records may optionally exclude infrequently occurring values for data elements as they may be deemed inaccurate or potentially erroneous. For example, if an information request was for a patient contact phone number, a phone number appearing once among a plurality of records may not be presented in the generated record. A phone number for a patient may be deemed of low relative importance, while medications may be deemed of high relative importance. Thus, different information elements of records may be afforded different importance levels. A physician may find it critical to see all medications found through the records of a patient, while all of the phone numbers may be superfluous. Thus, values of data elements with low frequency may be presented responsive to information requests for data elements with a high relative importance.

FIG. 7 illustrates another embodiment of the generation of a new record in response to an information request according to example embodiments provided herein. As depicted in FIG. 7, a condition, such as a patient condition, may be received from a "condition" field of a patient record. In the instant embodiment, there are three patient records, with each of records 1, 2, and 3, indicating that the patient has diabetes as a condition, as shown in 210. Based on majority rules logic and the prevalence of diabetes as a condition in the condition field of the records, diabetes is established as a condition of the patient in the new record 240. However, the code for the condition may differ between records, such as the type of diabetes, or merely a differing code from different facilities. As shown, the code field of records 1 and 2 both indicate code 73211009, while record 3 indicates code 609568004. According to the majority rules logic, code 73211009 is established as most likely to be correct and is used for the new record 240.

The start date field for each of the three records is also dissimilar, with record 1 indicating a start date of Oct. 12, 2010, record 2 indicating a start date of December 2010, and record 3 indicating an unknown start date. The majority rules logic may not be applied to each record entry as a whole since there are no equivalent record entries for the start date. However, the entries in the start date field may be analyzed using majority rules logic on a piecemeal basis. In such an embodiment, the logic may establish that the start date was in 2010, based on two of three records. Further, the start date may be estimated to be December, since one record unequivocally indicates a December 2010 start date, while another indicates a start date of Oct. 12, 2010. The number "12" from this record entry may be used to suggest that December is accurate, since a European date format would correspond to a date of Dec. 10, 2010. Further, there is no indication of a number "10" in record 2 or 3, such that the logic selects December 2010 as the start date for the composite record 240.

According to some embodiments, the logic implemented in processing circuitry 20 may also consider the significance between record field entries. A start date delta of two months between December 2010 and October 2010 may be determined to be insignificant, such that a determination may be made within a reasonable degree of error without harm. Conversely, record field entries of more significance, such as a medication dosage, may not be so readily estimated between disparate entries. Substantial disagreement between record field entries of a highly significant field such as a medication dose may be cause for alerting a user of the need for a manual review. This may be indicated by a visual indicator in the composite record rather than, or in addition to a value in the field.

According to some example embodiments described herein, different data elements of records may be given different significance ratings in order to establish which data elements can vary with little negative consequence versus data elements in which variation can be more detrimental. For example, a middle name of a patient may be given a low significance rating as the middle name may be relatively inconsequential to a healthcare provider other than for identification, while an allergen data element may be given a high significance rating since it may be imperative for a healthcare provider to understand the potential allergens for a patient. Generation of a new record satisfying an information request may estimate the middle name with less scrutiny and computation than the allergen element which may be given substantial scrutiny to ensure it is as accurate as possible.

While example embodiments have been described herein with regard to different records received from different sources, according to some example embodiments, the different records may only be different versions of the same record. A patient record may be created during a first visit, and that same record may be updated during a second visit. The first version of the record may include a pre-existing condition, demographic information, etc. The second version of the record may change the condition due to misdiagnosis or a second opinion from another physician. Both versions of the record may persist in memory, such as memory 24. During generation of a new record using processing circuitry 20, the first version of the patient record, the second version of the patient record, and any other records associated with the patient from memory 24 may be used. If various other records note a diagnosis consistent with the first version of the patient record, the new record satisfying an information request may indicate a diagnosis consistent with the first version of the record, despite the revised diagnosis of the second version of the record.

While majority rules logic can be used to create a new record satisfying an information request with a high degree of accuracy, additional information may be used to establish accuracy or to influence the entries used in the new record. Using the aforementioned example embodiment in which a second version of a record includes a new diagnosis, dismissing the original diagnosis of the first version as incorrect, a user may wish to more heavily influence the new diagnosis in the new record, despite the original diagnosis being more prevalent in existing records.

FIG. 8 illustrates an embodiment of the aforementioned example in which the patient has a diagnosis of Ulcerative Colitis in Record A, Version 1 310. Record B, Version 1, also indicates a condition of Ulcerative Colitis. Based on majority rules, the condition of the New Record 340 is Ulcerative Colitis. The New Record 340 may provide an indication that there is disagreement between records regarding the condition, such as using a visual indicator proximate the entry in the New Record 340. Upon selection of the condition of the New Record by a user, such as using a user interface 28, the user may be presented with the condition information 345 from each record used to generate the new record. This information may not only include the condition information and associated record, but also the record source (e.g., medical facility, physician information, etc.) and/or the date of creation. This may enable a user to determine a reliability of the data.

According to the illustrated embodiment of FIG. 8, a user may understand that Record A, Version 2, may be the most recent, most reliable record regarding the condition of the patient. The user may then select the condition from Record A, Version 2, indicating they believe this condition to be the most reliable. In response, the condition field of Record A, Version 2, may be given greater influence in establishing the new record. This greater influence may be user defined, such as a user may enter their own confidence level in the accuracy of the record field entry, and this may correlate to a weight afforded the record field entry selected. In the instant embodiment of FIG. 8, the weight afforded the diagnosis of Crohn's Disease from Record A, Version 2, may be sufficient to replace the condition of the new record in New Record; Version 2, to indicate a diagnosis of Crohn's Disease.

Referring back to the visual indicators of the New Record; Version 1 340, the visual indicators may be indicative of conflicting information underlying the record field values presented in the new record. The visual indicator may be based on the degree of conflicting information as determined using processing circuitry 20. For example, if a first record includes a first diagnosis, a second record includes a second diagnosis, and a third record indicates a third diagnosis, then the visual indicator may indicate a high degree of disagreement between the underlying records. This may be presented through a size of the visual indicator, a color of the visual indicator, or a shape of the visual indicator, for example on user interface 28.

The degree of disagreement or conflict represented by the visual indicator may also be indicative of the significance of the disagreement. For example, if a first record indicates a medication of acetaminophen with a dose of 100 milligrams, while a second record indicates a medication of acetaminophen with a dose of 150 milligrams, and a third record indicates a medication of acetaminophen with a dose of 125 milligrams, the significance of the disagreement between the records may be very small. While all of the records may disagree on the medication dose, the lack of significant disagreement may result in a visual indicator indicating only minor conflict.

The visual indicators indicating conflicting underlying data may also be indicative of the percentage of data that the presented value represents. For example, if four of five records indicate a first diagnosis, while the fifth record indicates a different diagnosis, the first diagnosis may be presented with a visual indicator indicative of 80% agreement among the records.

While the above-described embodiment enables a user to establish a reliability of a source of information for a data element of a record, embodiments may include that a source has an inherent reliability that correlates to the weight afforded the information in a data element from that source. For example, if a data element is user-entered, such as by a patient via user interface 28, the data element may be given a low weight as the data element is unconfirmed by a healthcare provider. Similarly, a data element entered in a record by a patient's primary care physician may be given substantial weight as it is presumed that this physician knows the patient in greater depth than most and is a reliable source of information.

Embodiments of the present invention may be illustrated through a flowchart, such as the flowchart of FIG. 9. As depicted, a first record may be received, such as via communications interface 26, where the first record has two or more elements and a first element having a first value at 410. A second record may be received, where the second record has two or more elements and a first element having a second value at 420. A third record may be received, where the third record has two or more elements and a first element having a third value at 430. A resultant value for the first element may be determined at 440, such as using processor 22, based on the frequency of occurrence of a value for the first element from among the first value, the second value, and the third value.

While not necessary, additional modifications to the methods described herein may be made, such as those illustrated in the flowchart of FIG. 9 in the flowchart blocks depicted in broken lines. For example, a resultant value of a second element, which may have a first value from a first record, a second value from a second record, and a third value from a third record, may be determined at 450. The value of the second element may be determined, for example by processor 22, as the most frequently occurring value of the second element from among the various records. A new record satisfying an information request may be generated by the processing circuitry 20 at 460 including the resultant value of the first element and the resultant value of the second element. The resultant value of the first element and the resultant value of the second element may each correspond to a respective one or more of the first record, second record, or third record. The records to which the resultant values may correspond may be different. For example, the resultant value for the first element may correspond to the first record, while the resultant value for the second element may correspond to the third record, for example.

As described above, FIG. 9 illustrates a flowchart of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices 24 of a computing device 12 and executed by processing circuitry 20 in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processing circuitry 20 may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A computing device comprising:
a processor; and
a memory coupled to the processor and comprising computer readable program code embodied in the memory that is executable by the processor to perform operations comprising:
receiving a first record associated with an individual comprising two or more elements of information related to the individual, wherein a first element of information associated with the individual of the first record has a first value;
receiving a second record comprising two or more elements of information related to the individual, wherein the first element of information associated with the individual of the second record has a second value;
receiving a third record comprising two or more elements of information related to the individual, wherein the first element of information associated with the individual of the third record has a third value;
determining a resultant value for the first element, wherein the resultant value for the first element is determined based on a frequency of occurrence of a value for the first element among the first value, second value, and third value, wherein the highest frequency occurrence of a value is determined to be the resultant value for the first element;
generating a composite record for the individual including the resultant value for the first element; and
providing an indication for the first element of the composite record that at least one of the first value of the first element, the second value of the first element, or the third value of the first element is different from the resultant value of the first element, wherein the indication comprises a visual indicator that is determined based on a significance rating and a degree of difference between the resultant value and the at least one of the first value of the first element, the second value of the first element, or the third value of the first element;
wherein the degree of difference is based on a quantitative difference between the resultant value and the first, second, or third value of the first element and the significance rating is based on a qualitative difference between the resultant value and the first, second, or third value of the first element, the qualitative difference being representative of a significance of disagreement between the resultant value and the first, second, or third value of the first element; and
wherein the visual indicator is indicative of a percentage of ones of the first value, the second value, and the third value that match the resultant value.

2. The computing device of claim 1, wherein the operations further comprise:
receiving a query, wherein the query is related to the first element;
identifying the first record, the second record, and the third record as relevant to the query;
generating a new record in response to the query, wherein the new record comprises the resultant value for the first element.

3. The computing device of claim 1, wherein a second element of the first record has a first value, a second element of the second record has a second value, and a second element of the third record has a third value, the operations further comprising:
determining a resultant value for the second element, wherein the resultant value for the second element is determined based on a frequency of occurrence of a value for the second element among the first value, second value, and third value for the second element, wherein the highest frequency occurrence of a value is determined to be the resultant value for the second element.

4. The computing device of claim 3, wherein the resultant value for the first element corresponds with a value of the first element from one of the first record, the second record, or the third record, wherein the resultant value for the second element corresponds with a value of the second element from one of the first record, the second record, or the third record, and wherein the one of the first record, second record or third record corresponding with the resultant value for the first element is different from the one of the first record, second record, or third record corresponding with the resultant value for the second element.

5. The computing device of claim 4, the operations further comprising:
generating a new record comprising the resultant value of the first element and the resultant value of the second element.

6. The computing device of claim 5, the operations further comprising:
providing an indication for the first element of the new record that at least one of the first value of the first element, the second value of the first element, or the third value of the first element is different from the resultant value of the first element.

7. The computing device of claim 6, the operations further comprising:
providing access to the first record, the second record, or the third record, in response to a user selection of the resultant value of the first element of the new record; and
presenting the at least one of the first value of the first element, the second value of the first element, or the third value of the first element that is different from the resultant value of the first element.

8. The computing device of claim 7, wherein the new record comprises a medication list associated with a patient; the first, second and third records, respectively, comprise records associated with the patient; the first element is a first medication; and the second element is a second medication.

9. The computing device of claim 1, wherein the first record is associated with a first source, the second record is associated with a second source, and the third record is associated with a third source, wherein each of the first source, second source, and third source comprise a respective reliability value, and wherein the value of the first element from each respective record comprises a reliability weight based on the reliability value of the respective source.

10. The computing device of claim 1, wherein the provided indication that is a visual indicator is presented through a size, color, or shape of the visual indicator without displaying the first value of the first element, the second value of the first element, or the third value of the first element.

11. The computing device of claim 1, wherein the significance rating is based, at least in part, on the type of information of the first element of the composite record.

12. A method comprising:
performing, on a processor, operations comprising:
receiving a first record associated with an individual comprising two or more elements of information related to the individual, wherein a first element of information associated with the individual of the first record has a first value;
receiving a second record comprising two or more elements of information related to the individual, wherein the first element of information associated with the individual of the second record has a second value;
receiving a third record comprising two or more elements of information related to the individual, wherein the first element of information associated with the individual of the third record has a third value;
determining a resultant value for the first element, wherein the resultant value for the first element is determined based on a frequency of occurrence of a value for the first element from among the first value, second value, and third value of the first element, wherein the highest frequency occurrence of a value is determined to be the resultant value for the first element;
generating a composite record for the individual including the resultant value for the first element; and
providing an indication for the first element of the composite record that at least one of the first value of the first element, the second value of the first element, or the third value of the first element is different from the resultant value of the first element, wherein the indication comprises a visual indicator that is determined based on a significance rating and a degree of difference between the resultant value and the at least one of the first value of the first element, the second value of the first element, or the third value of the first element;
wherein the degree of difference is based on a quantitative difference between the resultant value and the first, second, or third value of the first element and the significance rating is based on a qualitative difference between the resultant value and the first, second, or third value of the first element, the qualitative difference being representative of a significance of disagreement between the resultant value and the first, second, or third value of the first element; and
wherein the visual indicator is indicative of a percentage of ones of the first value, the second value, and the third value that match the resultant value.

13. The method of claim 12, wherein a second element of the first record has a first value, a second element of the second record has a second value, and a second element of the third record has a third value, the method further comprising:
determining a resultant value for the second element, wherein the resultant value for the second element is determined based on a frequency of occurrence of a value for the second element from among the first value, the second value, and the third value of the second element, wherein the highest frequency occurrence of a value is determined to be the resultant value for the second element.

14. The method of claim 13, wherein the resultant value for the first element corresponds with a value of the first element from one of the first record, the second record, or the third record, wherein the resultant value for the second element corresponds with a value of the second element from one of the first record, the second record, or the third record, and wherein the one of the first record, second record or third record corresponding with the resultant value for the first element is different from the one of the first record, second record, or third record corresponding with the resultant value for the second element.

15. The method of claim 14, further comprising:
generating a new record comprising the resultant value of the first element and the resultant value of the second element; and
providing an indication for the first element of the new record that at least one of the first value of the first element, the second value of the first element, or the third value of the first element is different from the resultant value of the first element.

16. The method of claim 15, further comprising:
providing access to the first record, the second record, or the third record, in response to a user selection of the resultant value of the first element of the new record; and
presenting the at least one of the first value of the first element, the second value of the first element, or the third value of the first element that is different from the resultant value of the first element.

17. The method of claim 16, wherein the new record comprises a medication list associated with a patient, the first, second, and third records, respectively comprise records associated with the patient; the first element is a first medication; and the second element is a second medication.

18. The method of claim 12, wherein the first record is associated with a first source, the second record is associated with a second source, and the third record is associated with a third source, wherein each of the first source, second source, and third source comprise a respective reliability value, and wherein the value of the first element from each respective record comprises a reliability weight based on the reliability value of the respective source.

19. A computer program product comprising:
a non-transitory computer readable storage medium comprising computer readable program code embodied in the medium that is executable by a processor to perform operations comprising:
receiving a first record associated with an individual comprising two or more elements of information related to the individual, wherein a first element of information associated with the individual of the first record has a first value;
receiving a second record comprising two or more elements of information related to the individual, wherein the first element of information associated with the individual of the second record has a second value;
receiving a third record comprising two or more elements of information related to the individual, wherein the first element of information associated with the individual of the third record has a third value;
determining a resultant value for the first element, wherein the resultant value for the first element is determined based on a frequency of occurrence of a value for the first element among the first value, second value, and third value, wherein the highest frequency occurrence of a value is determined to be the resultant value for the first element;
generating a composite record for the individual including the resultant value for the first element; and
providing an indication for the first element of the composite record that at least one of the first value of the first element, the second value of the first element, or the third value of the first element is different from the resultant value of the first element, wherein the indication comprises a visual indicator that is determined based on a significance rating and a degree of difference between the resultant value and the at least one of the first value of the first element, the second value of the first element, or the third value of the first element;

wherein the degree of difference is based on a quantitative difference between the resultant value and the first, second, or third value of the first element and the significance rating is based on a qualitative difference between the resultant value and the first, second, or third value of the first element, the qualitative difference being representative of a significance of disagreement between the resultant value and the first, second, or third value of the first element; and wherein the visual indicator is indicative of a percentage of ones of the first value, the second value, and the third value that match the resultant value.

* * * * *

UNITED STATES PATENT AND TRADEMARK OFFICE
CERTIFICATE OF CORRECTION

| | |
|---|---|
| PATENT NO. | : 11,163,772 B2 |
| APPLICATION NO. | : 15/071611 |
| DATED | : November 2, 2021 |
| INVENTOR(S) | : Elisabeth Berger |

It is certified that error appears in the above-identified patent and that said Letters Patent is hereby corrected as shown below:

In the Claims

Column 19, Line 1, Claim 18: Please correct "where in" to read -- wherein --

Signed and Sealed this
Nineteenth Day of July, 2022

*Katherine Kelly Vidal*

Katherine Kelly Vidal
*Director of the United States Patent and Trademark Office*